Oct. 14, 1969

R. E. PRICE 3,472,525

COLLET CHUCK

Filed June 29, 1966

INVENTOR
RALPH ELDRIDGE PRICE

BY
Mason, Porter, Diller & Brown
ATTORNEYS

Oct. 14, 1969  R. E. PRICE  3,472,525
COLLET CHUCK
Filed June 29, 1966  2 Sheets-Sheet 2
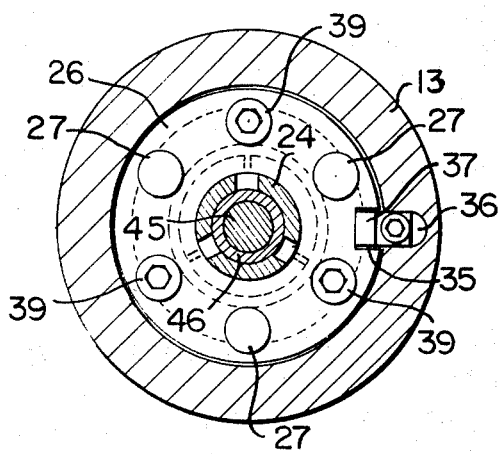
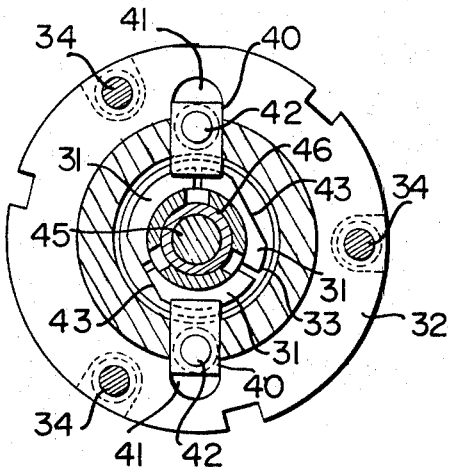
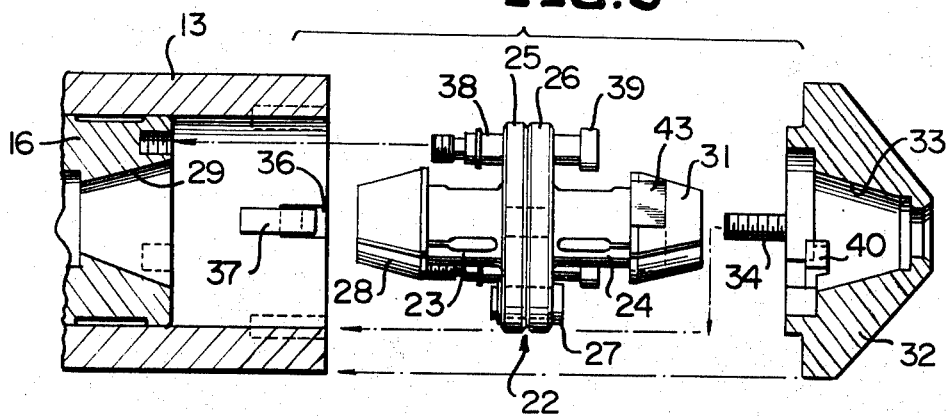
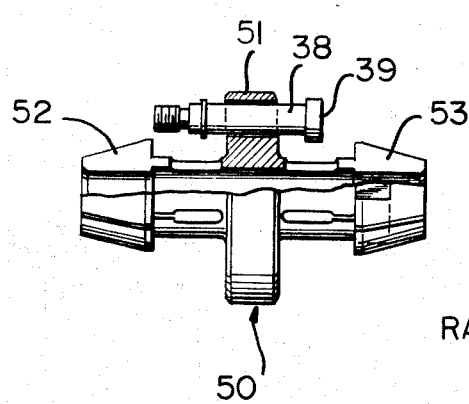
INVENTOR
RALPH ELDRIDGE PRICE
BY Mason, Porter, Diller & Brown
ATTORNEYS

United States Patent Office 3,472,525
Patented Oct. 14, 1969

3,472,525
COLLET CHUCK
Ralph Eldridge Price, Waynesboro, Pa., assignor, by mesne assignments, to Landis Tool Company, Waynesboro, Pa., a corporation of Delaware
Filed June 29, 1966, Ser. No. 561,442
Int. Cl. B23b 31/40, 5/34
U.S. Cl. 279—58                    10 Claims

ABSTRACT OF THE DISCLOSURE

This disclosure relates in general to collet chucks of the type having axially spaced work engaging elements. Each chuck of this type is actuated to grip a workpiece by means of an axially movable member having a conical recess which engages one end of the work engaging member and moves it radially and axially at the same time. The other end of the work engaging member is urged into engagement with a front retainer having a conical recess to urge the work engaging member at the end of the chuck radially into engagement with the same workpiece. The work engaging member may be removed from the front end of the chuck housing and replaced with a work engaging member for a different size workpiece.

Specification

There are two main objects of this invention. One object is to provide a double collet chuck in which the work engaging member may be removed from the front end of the chuck housing and replaced with a work engaging member for a different size workpiece so that it is not necessary to remove the entire chuck from the associated machine. In chucks of this type, it often happens that the co-acting surfaces of the actuating member and the work engaging member adhere to one another and fail to separate when the actuating member is retracted. Therefore, the second object is to provide an obstruction in the path of the retracting work engaging member to stop its retracting movement while that of the actuating member continues so as to separate the work engaging member from the actuating member.

In the past, chucks of this general type have been arranged for front removal of the work engaging member or the jaws thereof, but the manner in which the jaws are connected to the actuating member makes such front removal difficult. In accordance with this invention, stop abutments are mounted on the inside of the front retainer and extend radially into the path of the front jaws of the work engaging member. If the rear work engaging member tends to adhere to the actuating member and to move axially with the retracting actuating member, the removal will be limited by the stop abutments which are engaged by the front jaws to prevent further endwise movement of the work engaging member and thus to cause separation of the actuating member from the rear jaws of the work engaging member.

It is pointed out here that when the stop abutments are mounted on the front retainer, and removable therewith as a unit, there is nothing more in the way of the removal of the work engaging member except for the removal of the screws, which support the work engaging member, from the actuating member and connect the same together.

With the above and other objects in view that will hereinafter appear, the nature of the invention will be more clearly understood by reference to the following detailed description, the appended claims and the several views illustrated in the accompanying drawings:

In the drawings:

FIGURE 4 is a transverse sectional view taken through the collet chuck and shows the means for preventing relative rotation of the work engaging member and the chuck housing.

FIGURE 5 is a transverse vertical sectional view taken along the line 5—5 of FIGURE 3 and shows the relationship of the stop abutments with respect to the front jaws.

FIGURE 6 is an exploded longitudinal sectional view with the work engaging member being shown in elevation.

FIGURE 7 is an elevational view with parts broken away and shown in section of a modified form of work engaging member.

Figure 1:
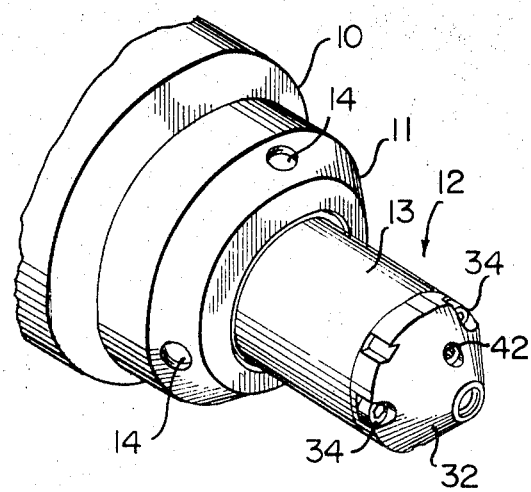
FIGURE 1 is a front perspective view of a machine tool headstock having mounted thereon a collet chuck formed in accordance with this invention.
Figure 3:
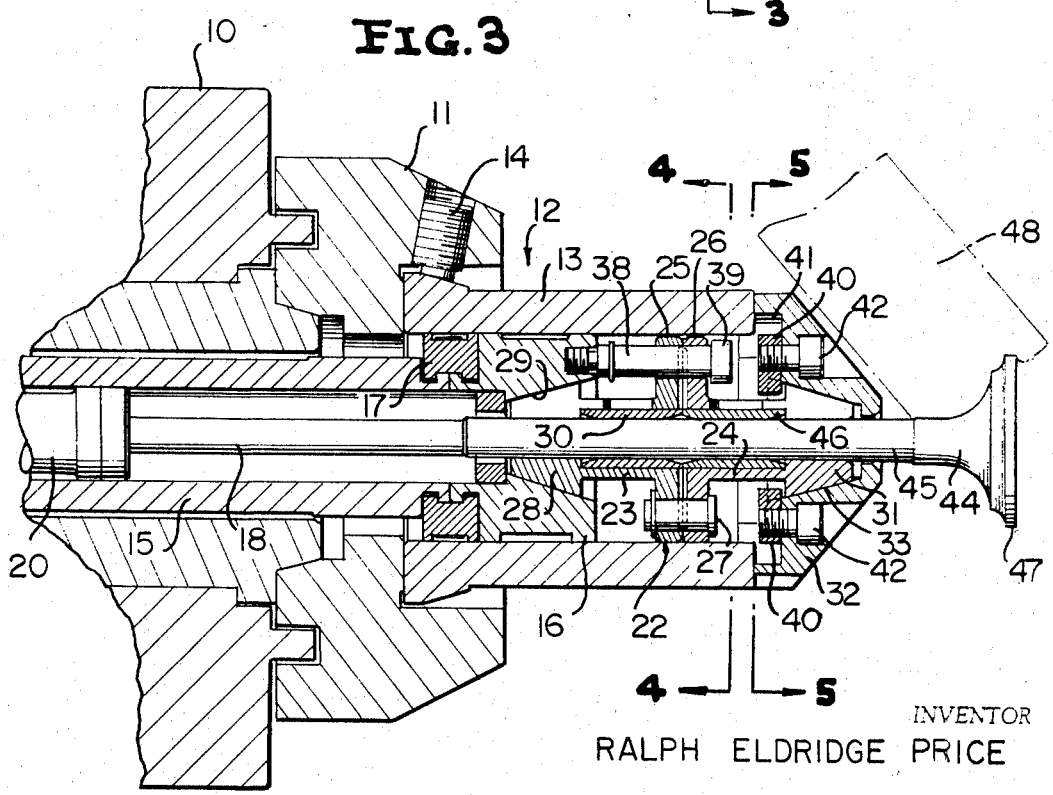
FIGURE 3 is a longitudinal fragmentary sectional view taken along the line 3—3 of FIGURE 2 on a smaller scale and shows the internal construction of the collet chuck.

Referring now to the drawings in detail, it will be seen that there is illustrated in FIGURES 1 and 3 a machine tool headstock construction which includes a headstock 10 which is preferably mounted for rotation and which has removably secured thereto in any conventional manner a suitable holding device 11. The holding device 11, in turn, supports a collet chuck which is referred to by the numeral 12 and includes a housing 13 which is releasably secured in the holding device 11 by means of a plurality of set screws 14.

The head stock 10 has mounted therein a sleeve 15 which is axially slidable. There is secured to the forward end of the sleeve 15 an actuating member 16. Although the coupling between the sleeve 15 and the actuating member 16 may be of any type, it is illustrated as including a split sleeve coupling 17.

The headstock 10 also includes an axial workpiece positioning member 18 which is disposed within the sleeve 15. If desired, the positioning member 18 may be replaceable and positioned by means of a plunger 20.

The collet chuck 12 includes a replaceable work engaging member which is generally referred to by the numeral 22. The form of work engaging member illustrated in FIGURE 3 is of a two-piece construction and includes a rear collet 23 and a front collet 24 having mounting flanges 25 and 26, respectively, secured together by circumferentially spaced fasteners 27. The rear collet 23 has a plurality of integrally formed rear jaws 28. The jaws 28 have tapered outer surfaces which match the inner surface of the actuating member 16, which actuating member is provided with a forwardly facing conical recess 29. The collet 23 also has a guide sleeve 30 for supporting an intermediate portion of a workpiece.

Figure 2:
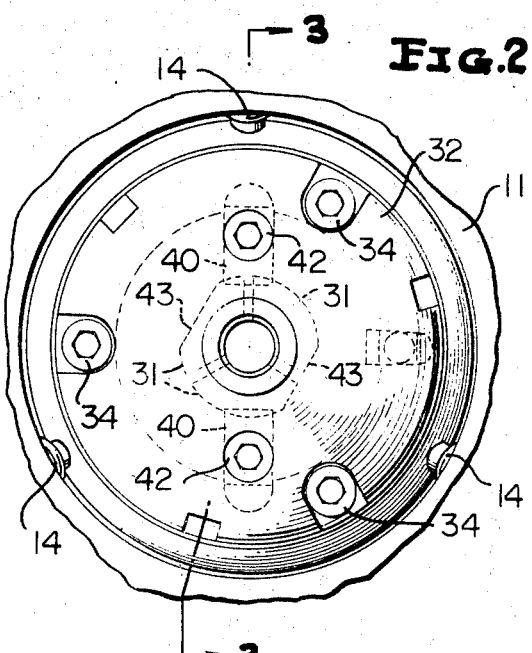
FIGURE 2 is an enlarged front elevational view of the collet chuck and shows further details thereof.

The front collet 24 is of the same general construction as the rear collet 23 and includes a plurality of integral front jaws 31 and a guide sleeve 46. The front jaws 31 have tapered outer surfaces which engage an inner surface of a front retainer 32, the front retainer 32 having a conical recess 33 which receives the front jaws 31. The front retainer 32 is removably secured to the housing 13 by means of circumferentially spaced fasteners 34 which are best shown in FIGURE 2.

The work engaging member 22 is constructed with the flanges 25 and 26 thereof having aligned notches 35, as is best shown in FIGURE 4. The housing 13 has recessed in a seat 36 formed therein a key 37 which is received in the notches 35 and prevents the rotation of the work engaging member 22 relative to the housing 13.

The work engaging member 22 is slidably mounted on three support bolts or pins 38 which pass through the flanges 25 and 26 and are threadedly engaged into the outer end of the actuating member 16. The pins 38 are provided at their forward ends with enlarged heads 39 which limit the relative movement of the actuating member 16 in a retracting direction relative to the work engaging member 22. The heads 39 are provided with suitable means for facilitating the turning thereof so as to unscrew the pins 38 from the actuating member 16.

In accordance with this invention, the front retainer 32 is provided with a pair of stop abutments 40. Each stop abutment 40 is generally rectangular in outline, as is clearly shown in FIGURE 5. The stop abutments 40 are seated against rotation within seats 41 formed in the retainer 32 and are releasably secured in place by means of fasteners 42.

In the assembled condition of the collet chuck 12, the stop abutments 40 are disposed behind the front jaws 31 and limit the retraction movement thereof so as to limit the retraction of the work engaging member 22 with the actuating member 16 and thus assure the separation of the jaws 28 from the actuating member 16.

It is to be noted that the stop abutments 40 have parallel opposed ends. It is also to be noted that the front jaws 31 have diametrically opposite flats 43 formed thereon. The spacing between the flats 43 is slightly less than the spacing between the opposed ends of the stop abutments 40 so as to permit passage of the stop abutments 40 past the front jaws 31 when they are aligned with the flats 43.

In the normal operation of the collet chuck 12, a workpiece, such as the valve 44, is positioned within the collet chuck 12 by sliding the stem 45 thereof through the guide sleeve 46 of the front collet 24 and then through the guide sleeve 30 of the rear collet 23. The stem 45 is moved into the collet chuck 12 until the end thereof abuts the stop element 18 which axially positioned the valve 44. With the valve 44 in this position, the sleeve 15 moves forwardly to move the actuating member 16 to the right, as viewed in FIGURE 3. As the actuating member 16 moves to the right, it engages the rear jaws 28 and thus imparts an axial movement to the work engaging member 22. As the work engaging member 22 moves to the right, the front jaws 31 thereof come into engagement with the walls of the conical recess 33 of the front retainer 32. Further movement of the actuating member 16 towards the front retainer 32 results in the radially inwardly collapsing of the jaws 28 and 31 and the gripping of the shank 45. The valve 44 is rotated due to the rotation of the collet chuck 12 by the headstock 10 and the head 47 of the valve is ground to the desired contour by engagement therewith by a grinding wheel 48.

After the required grinding operation has taken place on the valve 44, the actuating member 16 is retracted to the left, as viewed in FIGURE 3, for the purpose of releasing the valve stem 45. Normally, when the actuating member 16 moves to the left, it first moves away from the rear jaws 28 and the rear jaws 28 spring open. Further movement of the actuating member 16 to the left brings the enlarged heads 39 of the support pins 38 into engagement with the flange 26 to effect the movement of the work engaging member 22 to the left. If the work engaging member 22 moves to the left, the front jaws 31 are pulled away from the front retainer 32 and the front jaws spring open to complete the releasing of the shank 45.

In some instances the rear jaws 28 have a tendency to stick in the conical recess 29 of the actuating member 16 and the work engaging member 22 is moved to the left with the actuating member 16 so that the front jaws 31 are first released. After the work engaging member 22 has moved sufficiently to the left to assure the releasing of the front jaws 31, the front jaws, come into engagement with the stop abutments 40 so as to stop the movement of the work engaging member 22 to the left. As the actuating member 16 continues to the left, the rear jaw 28 will be released.

When it is desired to grind other workpieces having shanks of different diameters, in accordance with this invention, it is not necessary to replace the entire collet chuck 12, but to merely replace the work engaging member 22. This is accomplished by removing the three fasteners 34 which hold the front retainer 32 in position on the collet housing 13. Once the fasteners 34 have been removed, the front retainer 32 is rotated until the stop abutments 40 are in alignment with the flats 43 of the front jaws, after which the front retainer 32 and the stop abutments 40 may be removed as a unit. After this assembly has been removed, the support pins 38 may be readily unscrewed from the actuating member 16 so that the entire work engaging member 22 may be removed as a unit. The replacement of the work engaging member 22 is accomplished by a reversal of these steps.

Reference is now made to FIGURE 7 wherein there is illustrated a modified form of work engaging member which is generally referred to by the numeral 50. The work engaging member 50 differs from the work engaging member 22 in that in lieu of being made of two separate collets, having the flanges thereof connected together by the fastener 27, the work engaging member 50 has the collets thereof integrally formed and with a common relatively thick flange 51 which carries the support pins 38.

It is to be noted that the work engaging member 50 is constructed with multiple rear jaws 52 and front jaws 53. Although the work engaging member 50 has not been illustrated as being provided with central guide sleeves, such as the guide sleeves 30 and 46 of the work engaging member 22, it is to be understood that such guide sleeves may be provided in the work engaging member 50.

It will be readily apparent from the foregoing that there has been provided not only a simple arrangement for assuring the separation of both sets of jaws of the double collet chuck, but also that the means for assuring the opening of the rear set of jaws is advantageously carried by the front retainer in a manner which permits the removal thereof with the front retainer so as to facilitate the removal of the work engaging member as a unit as a replacement thereof with other work engaging members.

Although only a preferred embodiment of the invention has been specifically illustrated and described herein, it is to be understood that minor variations may be made in the collet chuck without departing from the spirit and scope of the invention as defined by the appended claims.

What is claimed as new:

1. A double jaw collet chuck comprising
   (a) a tubular body member,
   (b) a work gripping member comprising front and rear jaws,
   (c) a front retainer on said body member having a conical recess for engaging said front jaws,
   (d) an axially movable actuating member having a conical recess for engaging said rear jaws,
   (e) means mounting said front retainer for ease of removal,
   (f) and securing means readily accessible upon the removal of said front retainer releasably securing said work gripping member to said actuating member.

2. The chuck of claim 1 wherein
   (a) said securing means are in the form of supports for said work gripping member and said work gripping member is mounted for axial sliding movement thereon.

3. The chuck of claim 1 wherein
   (a) said securing means are in the form of supports for said work gripping member and said work gripping member is mounted for axial sliding movement thereon,
   (b) stops on said supports remote from said actuating member for limiting relative movement between said actuating member and said work gripping member.

4. The chuck of claim 1 wherein
(a) said securing means are in the form of supports for said work gripping member and said work gripping member is mounted for axial sliding movement thereon,
(b) stops on said supports remote from said actuating member for limiting relative movement between said actuating member and said work gripping member,
(c) stop abutments carried by said front retainer engageable by said work gripping member to limit movement of said front jaws out of said front retainer whereby separation of said rear jaws from said actuating member is assured.

5. The chuck of claim 1 together with
(a) stop abutments carried by said front retainer engageable by said work gripping member to limit movement of said front jaws out of said front retainer whereby separation of said rear jaws from said actuating member is assured.

6. The chuck of claim 1 together with
(a) stop abutments carried by said front retainer engageable by said work gripping member to limit movement of said front jaws out of said front retainer whereby separation of said rear jaws from said actuating member is assured,
(b) and cooperating means on said stop abutments and said front jaws facilitating the releasing of said stop abutments from behind said front jaws and the removal of said front retainer and said stop abutments as a unit.

7. The chuck of claim 1 together with
(a) stop abutments carried by said front retainer engageable by said work gripping member to limit movement of said front jaws out of said front retainer whereby separation of said rear jaws from said actuating member is assured,
(b) and cooperating means on said stop abutments and said front jaws facilitating the releasing of said stop abutments from behind said front jaws and the removal of said front retainer and said stop abutments as a unit,
(c) said cooperating means being complementary flats on said front jaws and staid stop abutments, and said front retainer being rotatable relative to said front jaws when said front retainer is released from said body.

8. A double jaw collet chuck comprising
(a) a tubular body member,
(b) a work gripping member comprising front and rear jaws,
(c) a front retainer on said body member having a conical recess for engaging said front jaws,
(d) an axially movable actuating member having a conical recess for engaging said rear jaws,
(e) means for advancing and retracting said actuating member,
(f) and means to limit the extent of retraction of said jaws in response to retraction of said actuating member.

9. The chuck of claim 8 wherein
(a) said jaws have a center portion in sliding relation with the inside surface of said body member.

10. The chuck of claim 8 wherein
(a) said means for limiting the extent of retraction of said jaws being carried by said front retainer.

References Cited

UNITED STATES PATENTS 2,502,216    3/1950    Grivna             279—51
3,282,614    11/1966   Entrikin            279—51

FOREIGN PATENTS 476,416    12/1937    Great Britain.

ROBERT C. RIORDON, Primary Examiner